United States Patent [19]
Fetz et al.

[11] Patent Number: 5,772,276
[45] Date of Patent: Jun. 30, 1998

[54] COMPOSITE FLOOR

[75] Inventors: Charles R. Fetz; Daniel J. McCormack, both of Savannah; John M. Jones, Bloomingdale; Michael I. Thomas, Savannah, all of Ga.; James T. Colling, Memphis, Tenn.

[73] Assignee: Great Dane Limited Partnership, Chicago, Ill.

[21] Appl. No.: 517,944

[22] Filed: Aug. 22, 1995

[51] Int. Cl.[6] .................................................. B62D 25/20
[52] U.S. Cl. ........................ 296/181; 296/182; 296/204; 296/191
[58] Field of Search .................................. 296/181, 182, 296/204, 191, 901

[56]         References Cited

U.S. PATENT DOCUMENTS

| | | | |
|---|---|---|---|
| 4,482,589 | 11/1984 | Widman | 296/901 X |
| 4,565,071 | 1/1986 | Bartling et al. | |
| 5,054,843 | 10/1991 | Gray | 296/181 X |
| 5,351,990 | 10/1994 | Thomas | |

FOREIGN PATENT DOCUMENTS

| | | | |
|---|---|---|---|
| 0220981 | 9/1990 | Japan | 296/204 |
| 8807485 | 10/1988 | WIPO | 296/182 |

OTHER PUBLICATIONS

Brochure entitled "Specifications and Options—Great Dane Classic Reefers"—Publication No. AND 193 KEN 12, No Date.
Brochure entitled "Great Dane SuperSeal Reefers"—Publication No. 444 MEI 992 KEN 10, No Date.
Brochure entitled "Great Dane—Domestic Reefer Containers"—Publication No. 457 HAU 494 KEN 3M, No Date.

*Primary Examiner*—Dean Kramer
*Attorney, Agent, or Firm*—Dority & Manning

[57]         ABSTRACT

Composite floor for an insulated or semi-insulated trailer including a unitary subfloor member and a unitary top floor member with a rigid foam core being located therebetween. The foam core has sufficient strength to transfer a cargo load from the top floor member to the bottom floor member without additional floor sills being located therebetween. The invention is further embodied in an improved method of manufacturing a floor as set forth above.

24 Claims, 9 Drawing Sheets

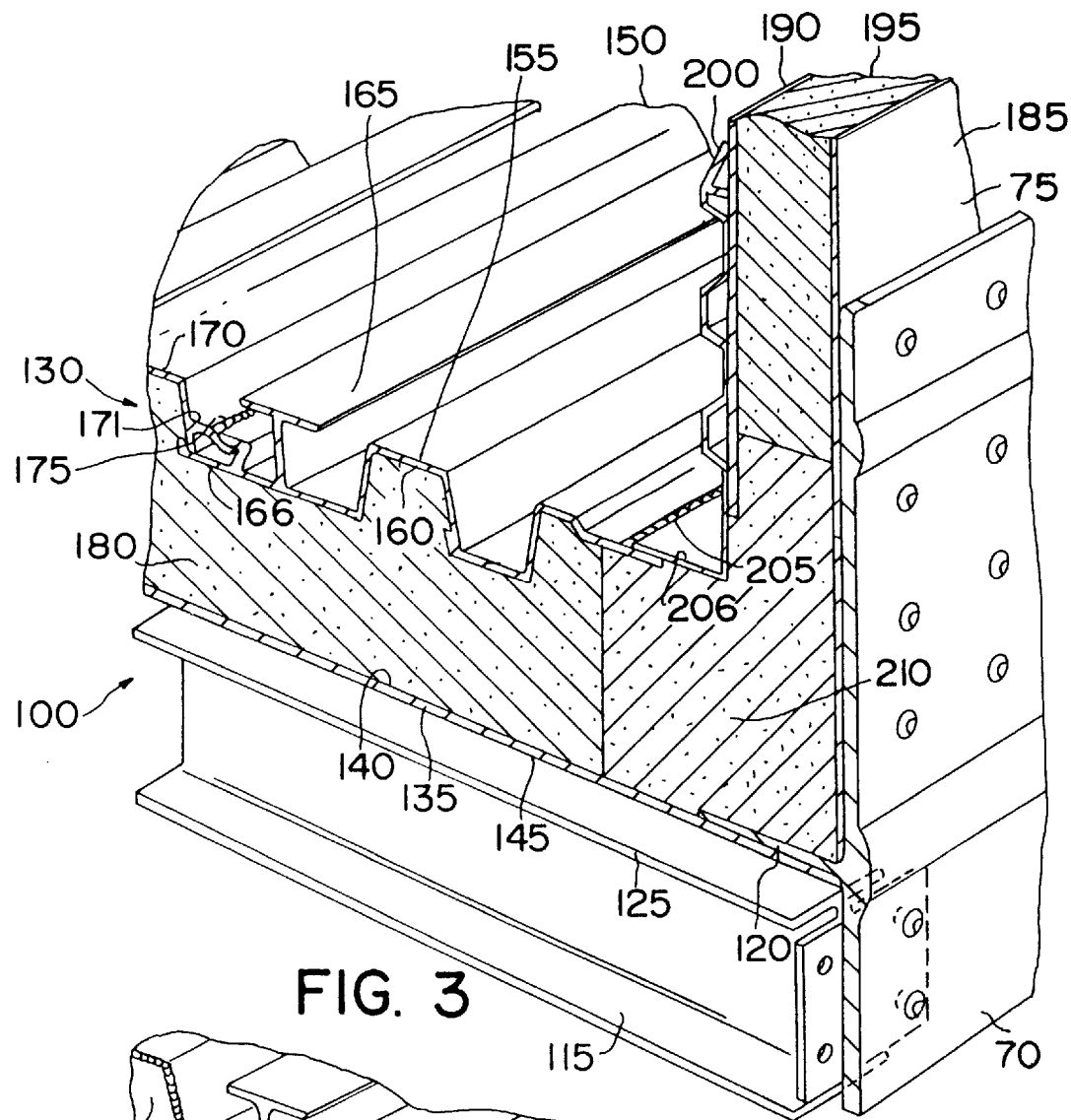
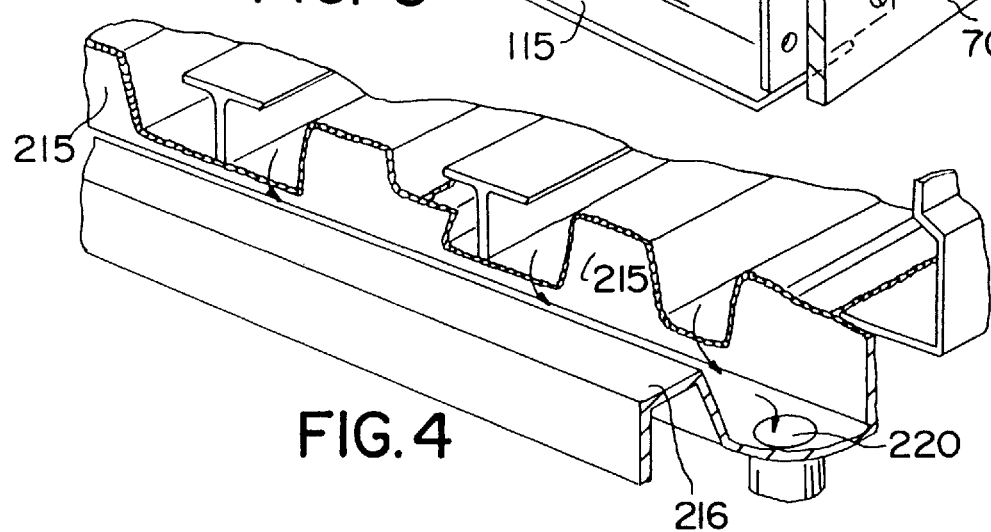

COMPOSITE FLOOR

BACKGROUND OF THE INVENTION

The present invention relates to trailers and more particularly to an improved unitized floor for insulated or semi-insulated trailers.

Conventional insulated or semi-insulated van type trailers are of monocoque construction. Monocoque constructed trailers comprise a frameless structural design in which the trailer body or shell acts as the principal load carrying element. These van type trailers include top and bottom side rails on both sides connected therebetween by a side wall structure. The side wall structure may consist of vertical support members connected between the top and bottom rails with an outer and inner skin located thereabout.

In a van type trailer, the floor assembly typically consists of a plurality of crossmembers, generally configured as I-beams extending transversely from one bottom rail to the other. In a conventional insulated configuration, a subfloor member extends over the crossmembers. Located in longitudinal spaced apart relationship and extending transversely to the longitudinal direction of the trailer are sill members that are received on top of the subfloor member. A top floorboard assembly is received on top of the sill members. The sill members create a cavity between the top floorboard and the subfloor into which an insulating foam is received to insulate the floor assembly. Typically, the sill members are screwed or otherwise fastened into the crossmembers through the subfloor, and the top floorboard is screwed or otherwise fastened into the sill members.

The floor assembly of a van type trailer functions in general as follows. In effect, this type of trailer receives its stiffness from the rail and side wall assemblies of the trailer. The top floorboard serves to transfer the load received thereon through the sill members through the subfloor member into the crossmembers. The crossmembers function to beam the load received thereon out to the bottom rail members, the floor assembly functioning generally as if it were suspended from the bottom side rails. The top floorboard also functions to disburse some of the load longitudinally so that adjacent crossmembers share a particular load. The function of a van type floor assembly differs from that of a flat bed type construction in that in a flat bed construction, the floor essentially rests on the main support beams and the load received thereon is transferred directly into the main support beams. Because of this construction, the van type trailer is significantly stiffer than a flat bed type trailer and the function of the floor assembly components with respect supporting the load is different.

In conventional van type insulated or semi-insulated trailer, certain disadvantages exist related to their current construction. For example, in use, these types of trailers are generally washed out between each haul. Over the life a trailer, any opening through which water can intrude is an opportunity for water to cause degradation in the floor sills and weight gain and loss of thermal efficiency as the insulating foam absorbs the water. Each screwhole can allow water intrusion directly on top of wooden floor sills and into the heart of the floor sill causing degradation therein. In addition, holes drilled through an extrusion, particularly when near an edge, can be a beginning point for stress cracks resulting from over-stressing. Furthermore, floor sills that are currently utilized are more thermally conductive than floors constructed utilizing the present invention because of the increased thermal conductivity of the floor sills, which typically are constructed of wood. In addition, replacement of floors of a conventional construction can be relatively expensive, since the floors are fastened into the crossmembers and must be reconstructed anew. Damaged crossmembers can more easily be replaced with a floor of the type of the present invention since the floor is not fastened to the crossmembers.

SUMMARY OF THE INVENTION

The present invention recognizes and addresses the foregoing disadvantages, and others of prior art constructions and methods.

Accordingly, it is an object of the present invention to provide an improved insulated or semi-insulated trailer.

It is another object of the present invention to provide an improved floor for a trailer.

It is another object of the present invention to provide an improved method of constructing a floor for a van-type trailer.

It is another object of the present invention to provide a floor with enhanced lifespan and improved usability.

These and other objects may be accomplished by providing an improved composite floor for an insulated trailer, the floor including a unitary subfloor member having an upper surface and a lower surface. The floor further includes a unitary top floor member, the top floor member having an upper surface and a lower surface and a rigid foam core, the core being sandwiched between the upper surface of the subfloor member and the lower surface of the top floor member. The foam core has sufficient strength to transfer a cargo load and the load from a cargo handling device from the top floor member to the bottom floor member without additional floor sills being located therebetween. In preferred embodiments, the top floor member is configured without defining any holes therein to prevent fluid from entering the foam core, and the subfloor member is configured without defining any holes therein as well. The lower surface of the top floor member may be prime coated to prevent corrosion of the top floor member. The floor may have a front section configured to be located at the front of the trailer and a rear section configured to be located at the rear of the trailer, with the density of the foam core being greater at the rear section than at the front section. In a preferred embodiment, the density of the foam of the front section may be approximately 6 lb./Cf. and the density at the rear section may be approximately 12 lb./Cf. In a further preferred embodiment, the bottom surface of the top floor member is configured to minimize stress in the foam core.

The invention in accordance with an embodiment of the present invention is further accomplished by providing an improved monocoque trailer, the trailer including a plurality of sidewall structures, each of which include a top rail and a bottom rail interconnected by a side wall. A front and rear end structure and a roof structure are also provided. The trailer further includes a floor structure, the floor structure including a plurality of crossmembers connected on opposite ends to the bottom rails for supporting a floor, and a one-piece composite floor received on the crossmembers. The one-piece composite floor includes a subfloor member, the subfloor member having an upper surface and a lower surface, and a top floor member, the top floor member having a upper surface and a lower surface. A rigid foam core is sandwiched between the upper surface of the subfloor member and the lower surface of the top floor member, wherein the foam core has sufficient strength to transfer a cargo load from a top floor member to the crossmembers without additional floor sills being located therebetween.

These and other objects are further accomplished by an improved method of making a floor for an insulated or semi-insulated trailer, the method including the steps of securing a plurality of top floorboard sections together into an integral top board member. The method includes the further step of locating the integral top floorboard member above and in spaced apart relationship to an integral subfloor member in a press assembly. The method includes the further step of providing removable mold boards in the press assembly around the perimeter of the floorboard members to create at least one cavity for receipt of rigid foam. The method further includes a step of injecting a rigid polyurethane foam into the at least one cavity and allowing the foam to cure. The method includes the further step of removing the mold boards and the floor from the press.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 3 is a partially broken away rear perspective view of a trailer floor structure in accordance with the present invention;

FIG. 4 is a detailed rear partial perspective view of a portion of the floor structure of the present invention;

Figure 1:
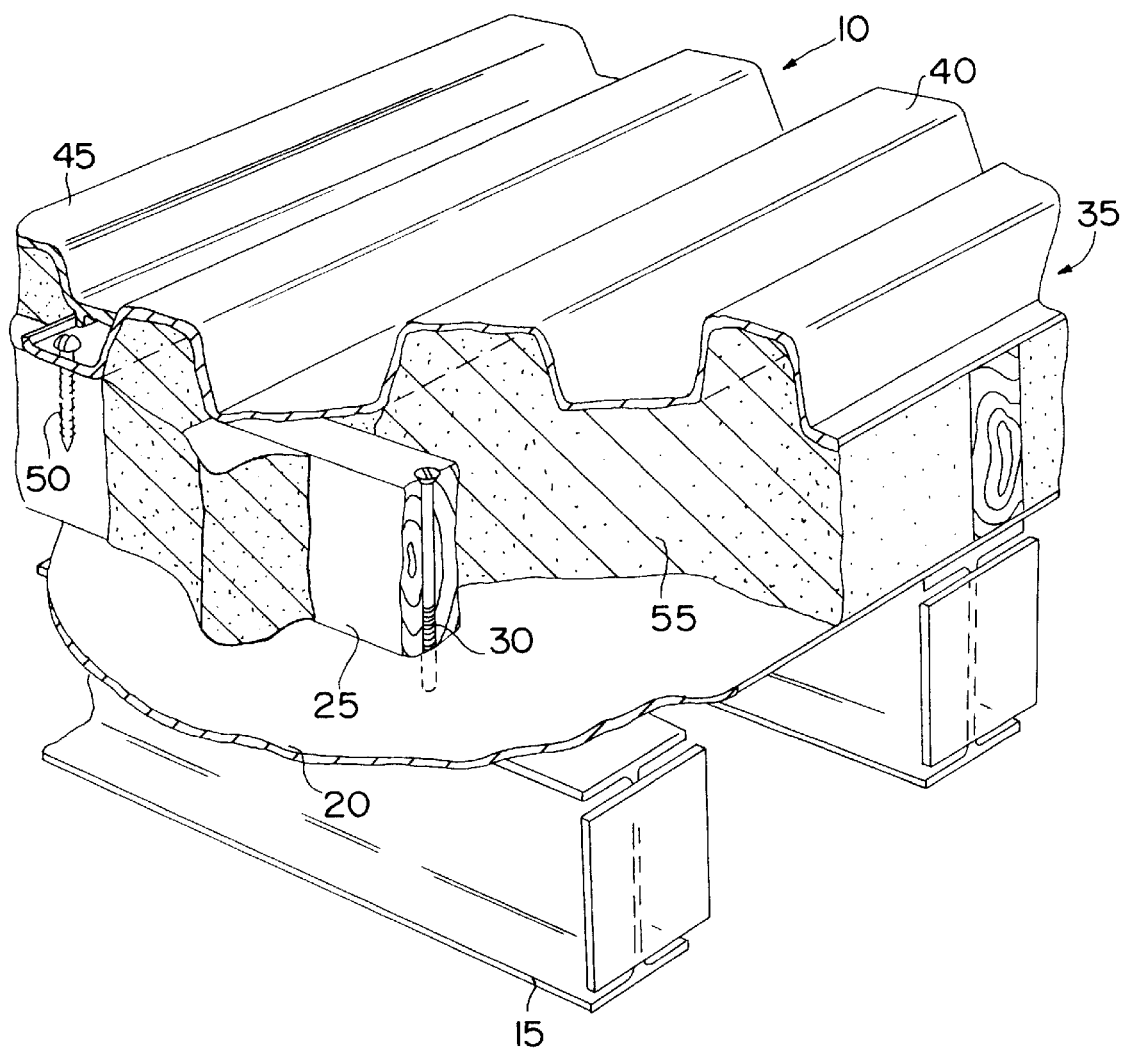
FIG. 1 is a partially broken away perspective view of a conventional refrigerated van type trailer floor structure.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a partially cut away perspective view of a conventional insulated van type floor structure is shown generally at 10. Floor structure 10 includes crossmembers 15 which extend transverse to the longitudinal direction of the trailer and are connected on both ends to trailer bottom rails as is well known in the art. Resting on crossmembers 15 is a subfloor member 20. Received on top of subfloor member 20 are transverse sill members that are secured to crossmembers 15 by fasteners 30. Fasteners 30 extend through sill members 25 through subfloor member 20 and into crossmembers 15. Received on and supported by sill members 25 is top floorboard member 35. Top floorboard member 35 is comprised of a plurality of floorboard panels as illustrated at 40 and 45. Top floorboard panel 40 is secured to sill members 25 by fasteners 50 which extend through top floorboard panel 40 and into sill member 25. Received between subfloor member 20 and top floorboard member 35 is insulating foam 55 for enhancing the thermal efficiency of floor structure 10. Insulating foam 55 typically has a density of approximately 2 to 2.6 lb./Cf.

Figure 2:
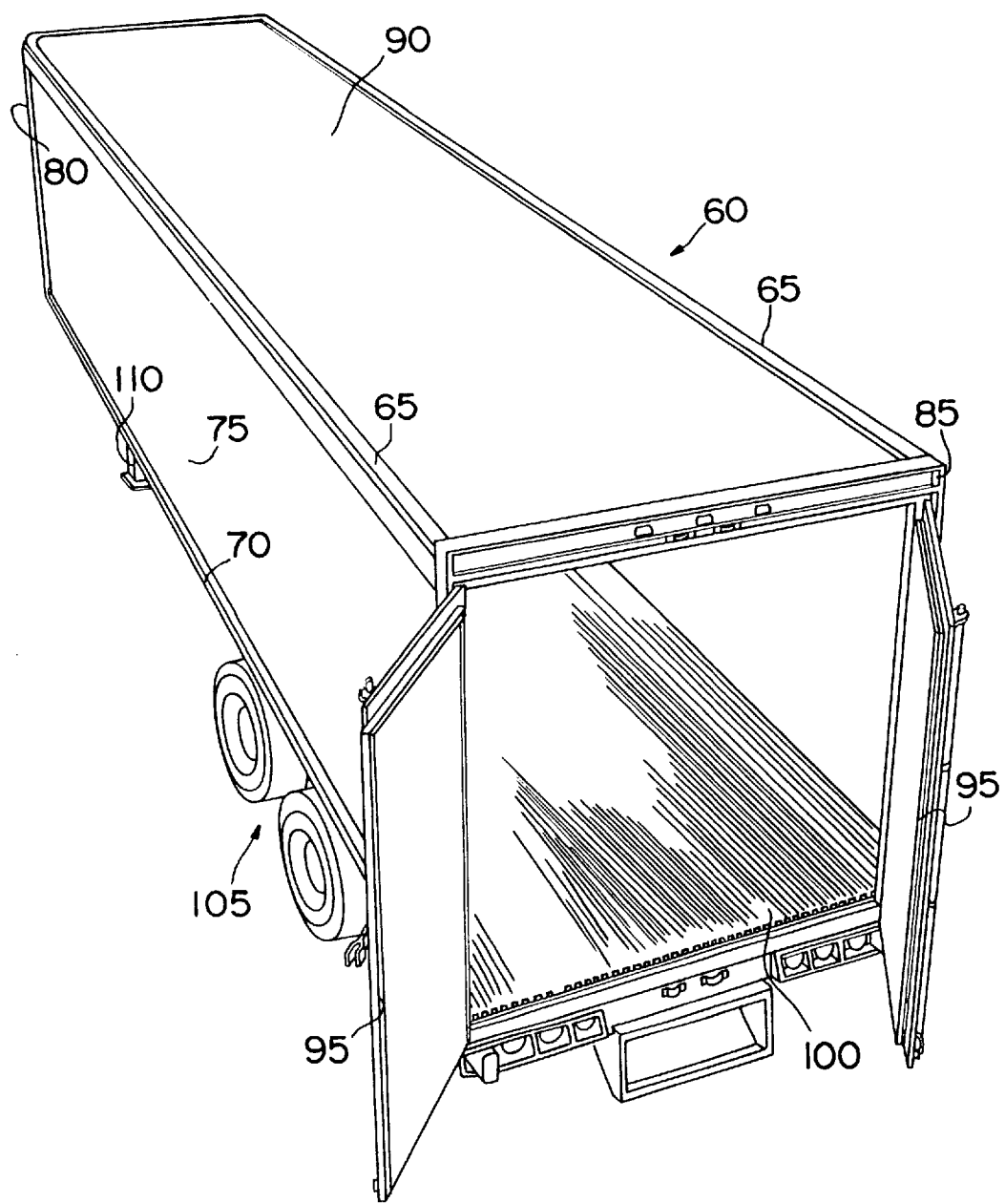
FIG. 2 is a rear perspective view of a van type trailer embodying a floor structure in accordance with an embodiment of the present invention.

Referring to FIG. 2, an insulated van trailer in accordance with an embodiment of the present invention is illustrated generally at 60. While an insulated van trailer is referred to throughout the present application for convenience, such terminology is intended to refer to both fully insulated and partially insulated refrigerated and non-refrigerated trailers as well as bimodal type shipping containers constructed in accordance with the principles of the present invention. Insulated van trailer 60 includes top rails 65 and bottom rails 70 (only one shown). Top rails 65 and bottom rails 70 are connected by a sidewall structure 75. A front wall assembly 80 and rear frame assembly 85 are connected on opposite ends of the top and bottom rails 65 and 70. A roof structure 90, front wall structure (not shown) and rear doors 95 for permitting entry and exit of cargo cooperate with floor structure 100 to form a monocoque construction insulated van trailer. Running gear assembly 105 and front support members 110 are also provided as is well known in the art. With the exception of the floor structure 100, the construction of insulated van trailer 60 is in accordance with known monocoque trailer constructions.

Referring to FIG. 3, a detailed perspective view of floor structure 100 in accordance with an embodiment of the present invention is illustrated. Crossmember 115 extends between right side bottom rail 70 and left side bottom rail (not shown). While only one crossmember 115 is illustrated, it should be appreciated that a plurality of such crossmembers longitudinally spaced along the length of the trailer 60 are provided as is known in conventional monocoque construction (see FIG. 1). Bottom rails 70 include flanges 120 that extend transversely toward the longitudinal center of the trailer 60. As embodied herein, crossmembers 115 are embodied as I-beams and flanges 120 are received on top flange 125 of crossmembers 115.

Figure 7A:
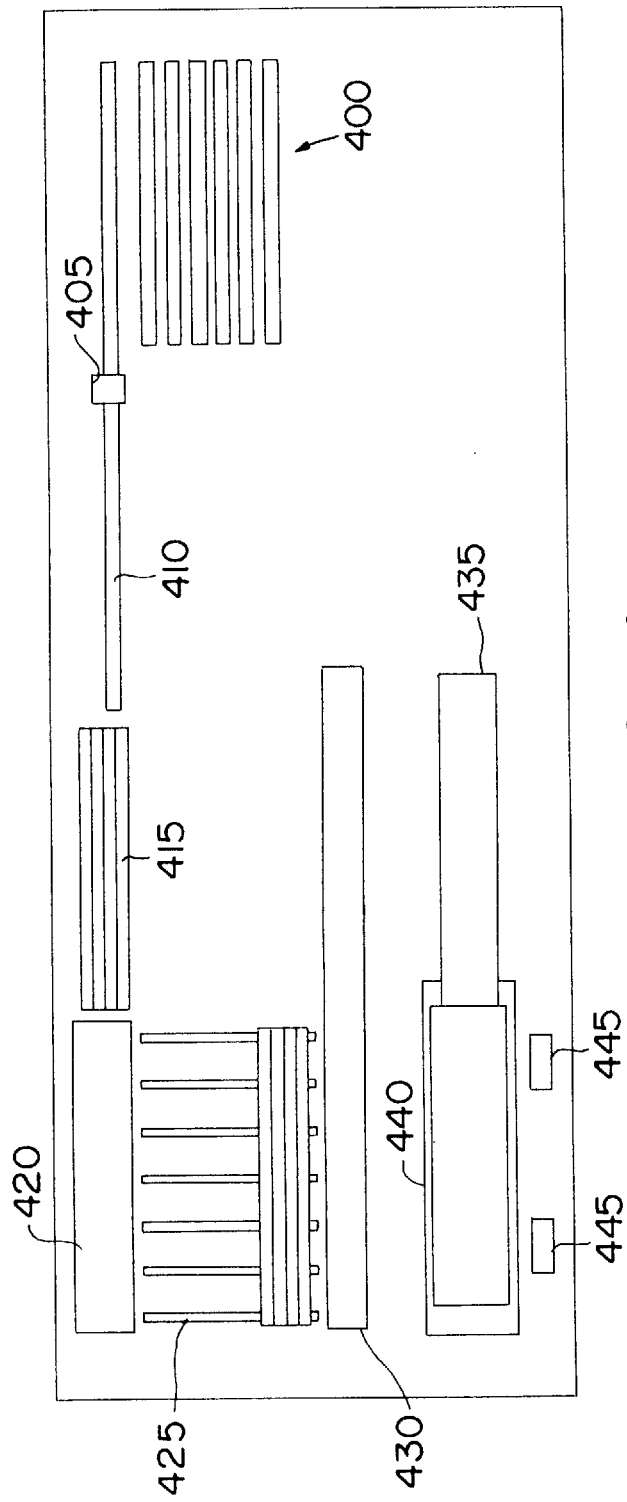
FIG. 7A is a schematic view of the equipment for practicing the method of the present invention.
Figure 7B:
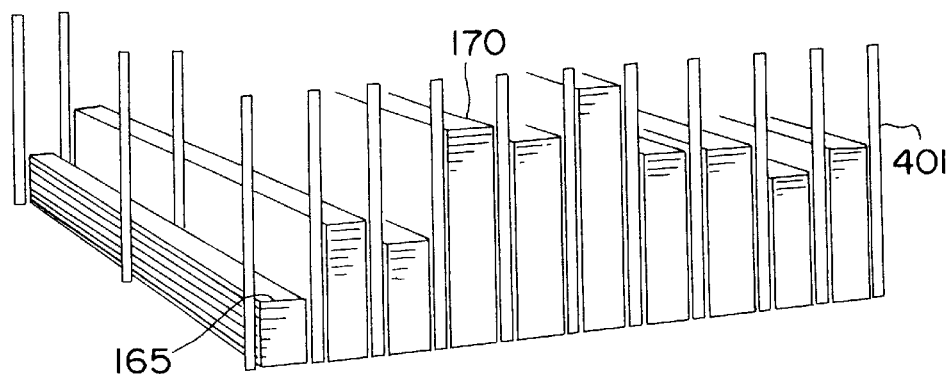
FIG. 7B is a partial perspective view of a material storage area in accordance with an embodiment of the present invention.
Figure 7C:
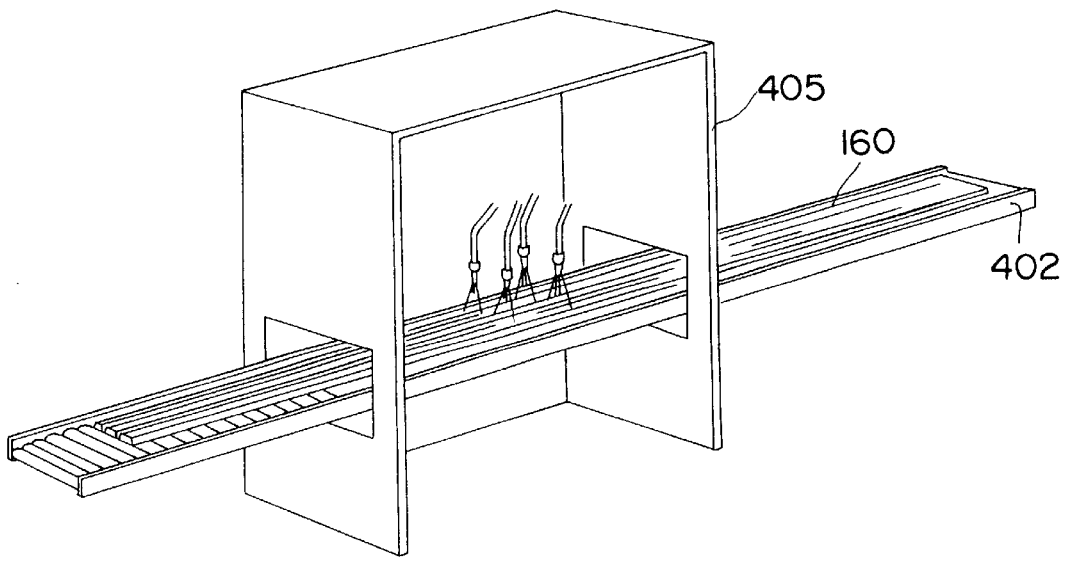
FIG. 7C is a partial perspective view of a primer application device in accordance with an embodiment of the present invention.
Figure 7D:
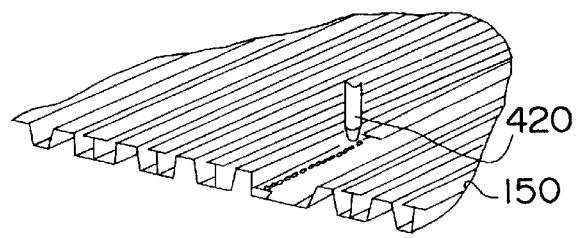
FIG. 7D is a partial perspective view of a welding device in accordance with an embodiment of the present invention.
Figure 7E:
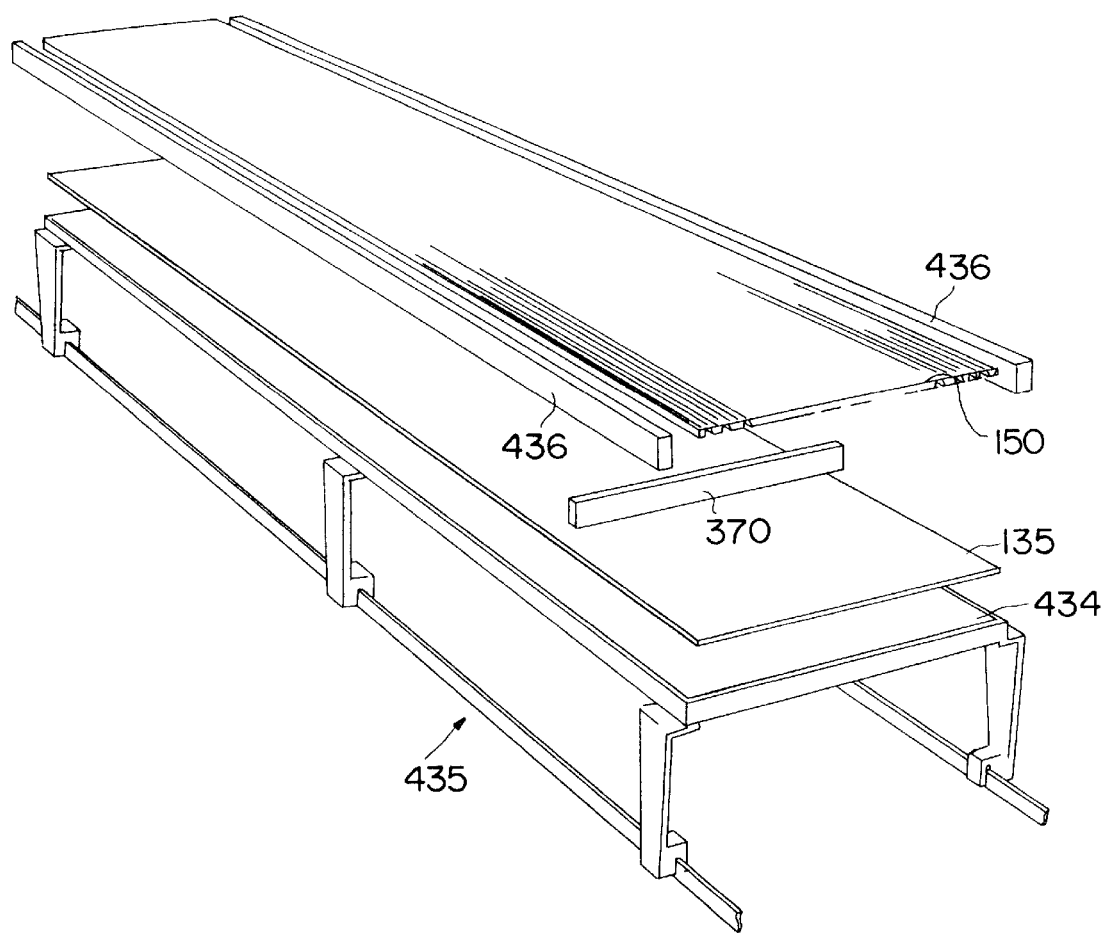
FIG. 7E is a partial perspective view of a press shuttle in accordance with an embodiment of the present invention.
Figure 7F:
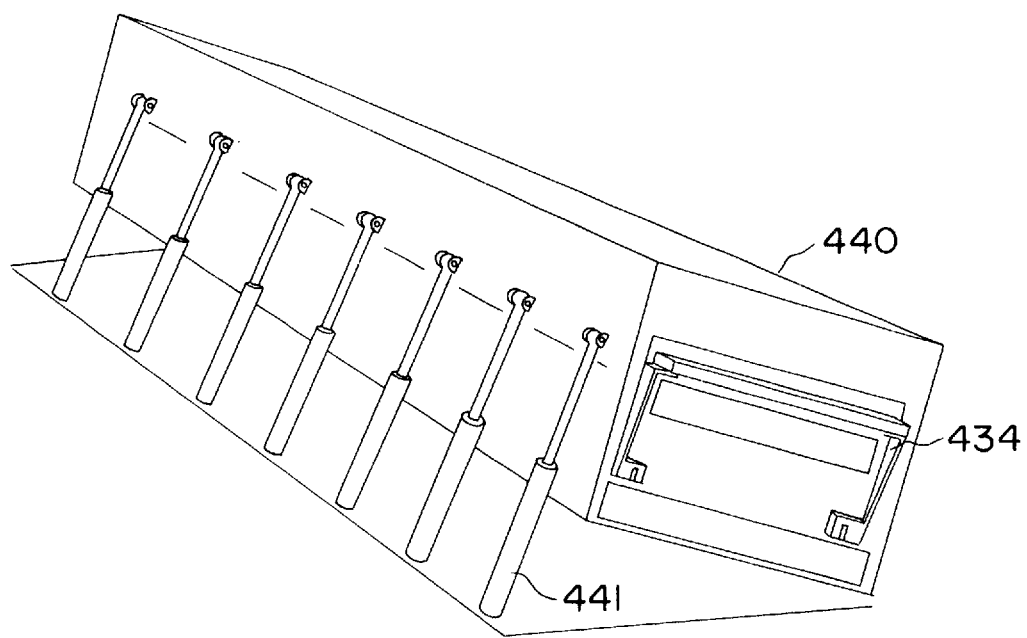
FIG. 7F is a partial perspective view of a press in accordance with an embodiment of the present invention.
Figure 7G:
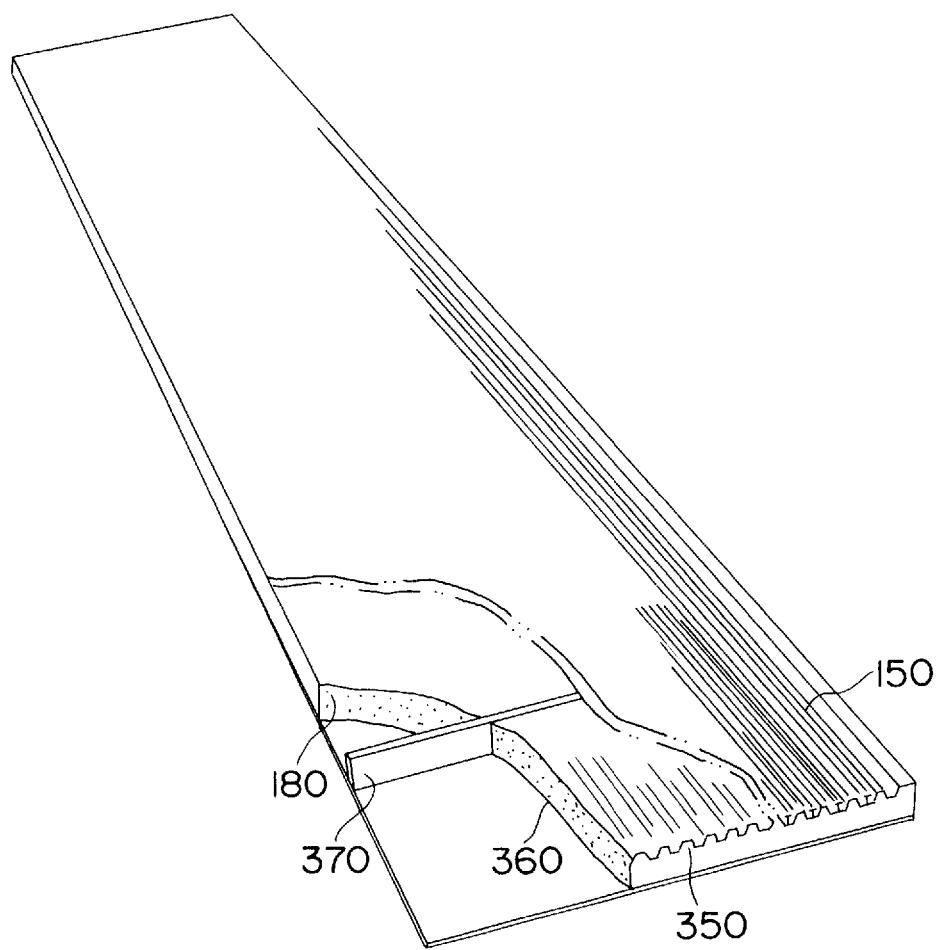
FIG. 7G is a perspective view partially cut away of a unitary floor in accordance with an embodiment of the present invention.

Referring to FIGS. 3 and 7G, in accordance with the present invention, a one-piece composite floor 130 is provided. One-piece composite floor 130 includes a subfloor member 135 having an upper surface 140 and a lower surface 145. Floor 130 further includes a unitary top floor member 150 which includes an upper surface 155 and a lower surface 160. Unitary top floor member 150 may be constructed from a plurality of floorboards 165, 170 which include interlocking portions 166 and 171. Interlocking portions 166 and 171 are maintained together by weld or other fastening means 175 to provide a unitary top floor member 150.

Received between upper surface 140 of subfloor member 135 and lower surface 160 of top floor member 150 is rigid foam 180. Rigid foam 180 has sufficient strength to transfer a cargo load from top floor member 150 to subfloor member 135 without floor sills being located therebetween. Foam 180 also has sufficient strength to support and transfer the load of the cargo handling equipment (i.e., forklift, pallet jack, etc.) as well to the crossmembers and trailer structure. Rigid foam 180 bonds to both the top floor member 150 and the subfloor member 135. Because no floor sills are necessary and the floor is a one-piece unit, it is also not necessary for top floor member 150 or subfloor member 135 to have holes therein as in the prior art.

In addition, because of the higher thermal conductivity of wood compared to foam, elimination of the sills allows for the manufacture of a thinner floor with the same thermal properties as a thicker floor with sills. This increases usable area within the trailer by providing for increased inside height without increase in the external dimensions of the trailer. In the alternative, a floor of the same thickness as a floor with sills can be manufactured but will have enhanced thermal properties compared to such floor. By way of example only, a foam core thickness (i.e., bottom of top floor, excluding channels, to top of subfloor) is in the range of 2 to 2½ inches for a presently preferred embodiment, but could be varied based on the principles set forth above.

Referring again to FIG. 3, one-piece composite floor 130 is received on crossmembers 115 and is maintained in place without the necessity of any fastening means. Sidewall structures 75 are attached to an upper portion of bottom rails 70 and include an outer skin 185, an inner skin 190 and an insulating foam 195 received therebetween. A scuff band 200 is attached by appropriate fastening means, such as rivets or the like, to inner skin 190 and extends to the upper surface 155 of top floor member 150 when one-piece composite floor 130 is in place. Welds, or other suitable securing means, 205 provide a watertight connection between the lower portion 206 of scuff band 200 and upper surface 155 of unitary top floor member 150. It should be appreciated that the structure illustrated in FIG. 3 is identical to the structure on the opposite side of the trailer, only one side being shown for convenience. Insulating foam 210 is received in the space formed between one-piece composite floor 130, insulating foam 195 and bottom rail 70.

As best illustrated in FIG. 4, end plug structures 215 are welded or otherwise secured to the open foamed channels of one-piece composite floor 130, and a gutter assembly 216, as is well known in the art, is welded thereto to drain water and the like out a drain hole 220 in a conventional manner.

Figure 5:
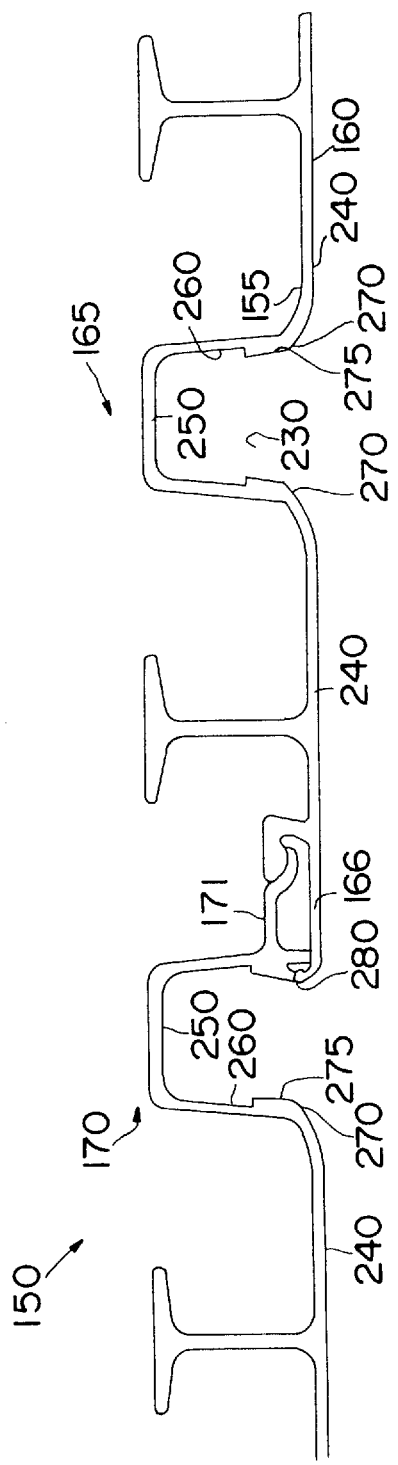
FIG. 5 is an end view of a section of top floorboard in accordance with an embodiment of the present invention.

Referring to FIG. 5, a detailed view of the configuration of the top floor member 150 is illustrated. The embodiment illustrated in FIG. 5 is an improved version of what is commonly known as a duct-T-duct floor configuration. In the present invention, rigid foam 180 is received in spaces 230 formed in top floor member 150. Top floor member 150 is configured to minimize stress in foam core 180 by maximizing its "footprint" or foam contact area and minimizing sharp corners. Floor surface 160 of top floor member 150 includes a series of foam contact portions 240 in a first horizontal plane, and a series of foam contact portions 250 in a second horizontal plane. Vertical portions 260, as best illustrated in FIG. 5, at the transition between horizontal foam contact portions 240 and vertical portions 260, include rounded edges 270 as well as thickened portions 275. Interlocking portion 166 of floorboard member 165 mates with interlocking portion 171 of floorboard member 170 so as to also provide a configuration that reduces stress in the foam core. As illustrated at 280, the configuration described above is constructed in a manner to transfer the force from cargo received on the upper surface of unitary top floor member 150 into subfloor member 135 and to crossmembers 115 while minimizing concentrated stress in foam 180.

Figure 6:
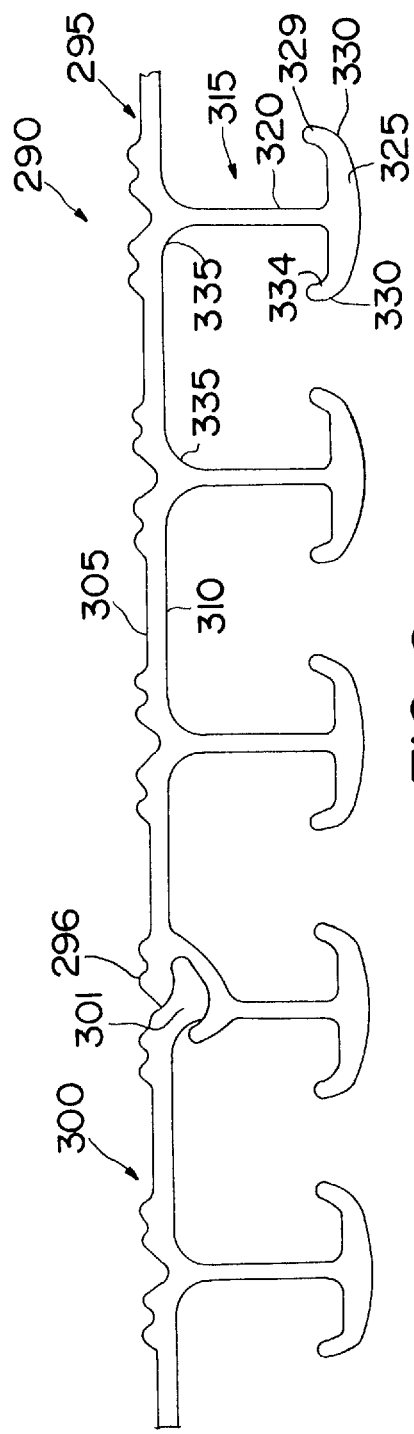
FIG. 6 is an end view of a section of top floorboard in accordance with another embodiment of the present invention.

Referring to FIG. 6, an alternate embodiment of the unitary top floor member 290 is illustrated. Unitary top floor member 290 includes a plurality of floorboard members 295 and floorboard members 300 with interlocking portions 296 and 301, respectively. Top floor member 290 further includes an upper surface 305 and a lower surface 310. The top surface of the top floor member 290, as illustrated in FIG. 6, is generally known as a cargo floor structure. In the present embodiment, lower surface 310 of floorboards 295 include a plurality of downwardly projecting segments 315 including a vertical neck portion 320 and a lower end segment 325. Lower end segment 325 is configured with upwardly turned portions 329, 334 with rounded edges 330. The connection points between downwardly projecting segments 315 and lower surface 310 of floorboards 295 also include rounded edges 335. The configuration set forth in FIG. 6 serves to firmly anchor top floor member 290 into rigid foam core 180 and to minimize stress created therein when a cargo load is placed on top floor member 290.

While two particular floor extrusion structures are illustrated herein, it should be appreciated that other suitable top floor extrusions could be utilized. An example would be a fully hollow extrusion, i.e., where the bottom surface of the top floorboard has a continuously flat base or foam contact surface, including under the channel openings. Other floor configurations, such as "Tee" projections with a flat footprint could also be utilized. In addition, in a preferred embodiment, the walls of the top floorboard are at least 0.06 inch thick, and the thickness of the subfloor is at least 0.06 inch thick, and preferably 0.075 inch thick if fiberglass. Subfloors constructed of aluminum of approximately 0.040 inches thick or galvanized steel of approximately 0.019 inch thick could also be utilized. Of course, these dimensions are by way of example only.

As set forth above, rigid foam 180 is of sufficient strength to eliminate the need for floor sills as used in conventional floors of this type. The floor of the present invention deflects less than conventional designs due to the inherent strength achieved by the unitized composite construction that distributes loads more evenly throughout the floor system. In addition, the thickness of the floor with comparable insulating characteristics to prior art structures can be reduced due to the enhanced thermal properties without sills.

Since trailers of this type are routinely loaded from the rear and can receive significantly greater wear and dynamic load in the rear door area, an embodiment of the present invention also includes utilizing a foam that is more dense and/or stronger at the rear portion of the floor than that utilized in the remainder of the floor. In a preferred embodiment, the structural properties of the foam in the rear section of the floor are approximately three times greater than the remainder of the floor. Use of enhanced foam eliminates the need for any additional floor support inserts as are commonly used in the prior art.

As illustrated in FIG. 7G, a rear portion of the floor 350 may include a rigid foam 360 that is stronger than rigid foam 180 utilized in the remainder of the floor structure. A dam member 370 may be located between these two sections to assist in manufacture of the floor as will be set forth in more detail with respect to the discussion of the method of the present invention as set forth below. Except for the foam core, the construction of the floor in the rear portion is the same as in the main floor portion. In one example, rear portion 350 may extend approximately 3 feet.

In a preferred embodiment, rigid foam 360 may have a density in the range of approximately 10–17 lb./Cf, and most preferably approximately 12 lb./Cf, and rigid foam 180 may have a density in the range of approximately 4–8 lb./Cf, and most preferably approximately 6 lb./Cf. All densities referred to herein are core densities. In a presently preferred embodiment, one example of a suitable foam 180 for the main section of the trailer floor would be a high strength rigid polyurethane foam designated as Baytherm 930, manufactured by Bayer Corporation, 100 Bayer Road, Pittsburgh, Pa. 15205. One presently preferred foam 360 for section 350 of the floor would be a high strength rigid polyurethane foam designated as Baytherm 931, also available from Bayer Corporation, 100 Bayer Road, Pittsburgh, Pa. 15205-9741. These preferred foams for the present invention are prepolymer foams, which have been found to be somewhat flexible and tolerant of defects and to have some elasticity.

In a preferred embodiment of the present invention, the underside or lower surface 160 of top floor member 150 is primed prior to insertion of foam 180. This is typically accomplished by priming the lower surface of the individual floorboards 165, 170 prior to assembly and welding. Priming of the underside helps to eliminate corrosion and maintain top floor structural integrity and extend floor life. In a presently preferred embodiment, the primer is a water-base self-etching epoxy primer marketed under the Lilly brand, Part No. 42300927, by Lilly Industries in Indianapolis, Ind. While the above foams and primers are presently preferred, it should be appreciated that any suitable foam or primer could be utilized within the scope of the present invention.

In accordance with the present invention and as best illustrated in FIGS. 7A through 7F, an improved method of manufacturing a one-piece composite floor is set forth herein. FIG. 7A illustrates a schematic representation of the various stations utilized in the manufacturing method of the present invention. A floorboard storage area is illustrated in FIG. 7A generally at 400. A primer application station is illustrated generally at 405 with primer drying racks being illustrated generally at 410. A floorboard member set up area is illustrated generally at 415, and a gantry welding station is illustrated generally at 420. A transfer table is illustrated generally at 425 with a holding table illustrated generally at 430. A press shuttle and foaming set up area is illustrated generally at 435 along with a press 440 and foaming machines 445 utilized in the present method.

Referring to FIG. 7A and to FIGS. 7B through 7F, when appropriate, the method of the present invention will be described in more detail. Floorboard members 165, 170 (sometimes referred to as extrusions) may be initially maintained in storage racks 401. Floorboard members 165, 170 are placed on a primer paint conveyor 402 where they are cleaned and moved into a primer paint booth 405 where a primer is applied to their lower surfaces 160. From primer paint booth 405, floorboard members 165, 170 are moved to rotating primer drying racks illustrated generally at 410 in FIG. 7A to be maintained until the primer is dry.

Floorboard members 165, 170 are then moved to floorboard set up table 415 where a sufficient number of such floorboard members 165 and 170 are interlocked to form a top floor member 150. The number of floorboard members 165, 170 utilized to construct unitary top floor member 150 is dependent on the size of the floor member 150 desired and the size of the particular floorboard members 165, 170. After they are interlocked, they are moved to a gantry welding station 420 where a continuous weld is made along each floor seam to produce a water-impenetrable unitary top floor member 150. Unitary top floor member 150 is then moved to a holding table 430, and from there to a foam press shuttle 435 as illustrated in more detail in FIG. 7E.

Subfloor member 135 is placed on mold 434 which is carried by foam press shuttle 435. Unitary top floor member 150 is held in spaced apart relation above subfloor member 135 on mold 434 by mold boards 436. Dam member 370 is placed between top floor member 150 and subfloor member 135 and mold boards 436 to create front and rear cavities for the injection of foam 180 and 360. End mold boards, not shown, are also placed on opposite ends to complete the creation of these two cavities. Mold boards 436 have ventilation holes therein to allow air to escape from the front and rear cavities during foaming. The components are then shuttled into the press and clamped together between the platens of the press which are brought into contact with the top floor member and the subfloor member.

The press platens are preheated to preheat the top floor member and the subfloor member. In a preferred embodiment, the platens and facers (top floor member and subfloor member) are preheated by circulating water to a temperature of approximately 95° F. to 120° F.

As best illustrated in FIG. 7F, press 440 includes a mechanism, illustrated herein as hydraulic cylinders 441, for pivoting press 440 to a desired angle prior to injection of the foams 180 and 360. As presently preferred, press 440 is tilted to place the floor components at an angle of approximately 15 degrees with respect to the horizontal.

After tilting press of 440 has occurred, foam machines 445 are activated to inject foam into the defined cavities to create the one-piece composite floor 130. In a preferred embodiment, foam 180 is injected at two points into the main cavity and foam 360 is injected at one point into the rear cavity. The components of the foam are preheated to a temperature of approximately between 70° F. and 90° F. Of course, it should be appreciated that these preheat temperatures are for the particular foams set forth herein and may vary depending on the particular foam selected for the application.

Foams 180 and 360 are injected into the respective cavities in liquid form, where they rise and fill the cavities between the panels while pushing air out through the ventilation holes in the mold boards. As it is filling the cavities, the foam creams, rises, and then gels in an exothermic reaction. As injection of the foam is begun, water continues to be circulated through the press platens to assist in removing the heat of the exothermic reaction through the top floorboard and subfloor member. During the foaming process, the maximum amount of water possible is circulated through the press platens in an effort to limit the temperature from the exothermic reaction from exceeding approximately 275 to 350 degrees Fahrenheit. It has been found with the presently preferred foams, that the foam will become friable or have a tendency to crack if it exceeds this temperature. After the cavities have filled, the panel is typically cured in the press for between 30 and 40 minutes.

Once the floor has cured, it is removed from the press. The floor is shuttled out of press 440, the mold boards are removed, and the floor is moved into a storage area. The floor assembly is then maintained at room temperature for a period of approximately 24 to 48 hours to complete the curing process. When it is desired to install the floor in a trailer such as illustrated at 60 in FIG. 2, the one-piece floor assembly 130 is received on top of crossmembers 115 and secured in place by the scuff bands 200, a front gutter assembly (not shown), and gutter assembly 216 as set forth above.

In a presently preferred embodiment, floorboard members 165, 170 are constructed of extruded aluminum and subfloor member 135 is constructed of fiberglass. While duct-T-duct and flat cargo configurations of top floor member 150 are illustrated, it should be appreciated that various floor structures constructed in accordance with the principles of the present invention are within the scope and contemplation of the present invention. It should also be appreciated that the terminology "unitary" used herein in reference to the top floor and subfloor includes constructions where multiple pieces or members are put together to become unitary, including multiple pieces maintained together by the completed structure itself. The terminology "one piece" with respect to the composite floor is intended as descriptive of the floor in a finished or substantially finished state and includes multiple components as set forth in the present specification. It should also be appreciated by those skilled in the art that materials set forth herein are by way of example only, and other suitable materials could be utilized.

Modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A composite floor for an insulated trailer, said floor comprising:
   a unitary subfloor member, said subfloor member having an upper surface and a lower surface;
   a unitary top floor member, said top floor member having an upper surface and a lower surface;
   a rigid foam core extending substantially uniformly across the lateral width of the floor, said core being sandwiched between the upper surface of the subfloor member and the lower surface of the top floor member wherein said foam core has sufficient strength to transfer a cargo load from the top floor member to the subfloor member without additional support structure interconnecting the top floor member and subfloor member; and
   wherein said subfloor member is configured without defining any holes therein to prevent fluid from entering the foam core.

2. A composite floor for an insulated trailer as stated in claim 1, wherein said top floor member is configured without defining any holes therein to prevent fluid from entering the foam core.

3. A composite floor for an insulated trailer as stated in claim 1, wherein the lower surface of said top floor member is prime coated to prevent corrosion of the top floor member.

4. A composite floor for an insulated trailer as stated in claim 1, wherein said foam core has a density in the range of 4–8 lb./Cf.

5. A composite floor for an insulated trailer as stated in claim 4, wherein said foam core has a density of approximately six pounds per cubic foot (6 lb./Cf).

6. A composite floor for an insulated trailer as stated in claim 1, wherein the lower surface of said top floor member is configured to minimize stress in the foam core.

7. A composite floor for an insulated trailer, said floor comprising:
   a unitary subfloor member, said subfloor member having an upper surface and a lower surface;
   a unitary top floor member, said top floor member having an upper surface and a lower surface; and
   a rigid foam core, said core being sandwiched between the upper surface of the subfloor member and the lower surface of the top floor member wherein said foam core has sufficient strength to transfer a cargo load from the top floor member to the subfloor member without additional floor sills being located therebetween;
   wherein said composite floor has a front section configured to be located at the front of the trailer and said composite floor has a rear section configured to be located at the rear of the trailer, the density of the foam core being greater at the rear section than at the front section.

8. An composite floor for an insulated trailer as stated in claim 7, wherein said rear section has a foam density in the range of 10–17 lb./Cf.

9. A composite floor for an insulated trailer as stated in claim 7, wherein the density of the foam at the front section is approximately 6 lb./Cf and the density at the rear section is approximately 12 lb./Cf.

10. A composite floor for an insulated trailer, said floor comprising:
    a unitary subfloor member, said subfloor member having an upper surface and a lower surface;
    a unitary top floor member, said top floor member having an upper surface and a lower surface; and
    a rigid foam core, said core being sandwiched between the upper surface of the subfloor member and the lower surface of the top floor member wherein said foam core has sufficient strength to transfer a cargo load from the top floor member to the subfloor member without additional floor sills being located therebetween, wherein the lower surface of said top floor member is configured to minimize stress in the foam core,
    wherein the lower surface of said top floor member includes a series of foam contact portions in a first horizontal plane and a series of foam contact portions in a second substantially parallel plane, both said foam contact portions including rounded edges to minimize stress in the foam core.

11. A composite floor for an insulated trailer, said floor comprising:
    a unitary subfloor member, said subfloor member having an upper surface and a lower surface;
    a unitary top floor member, said top floor member having an upper surface and a lower surface;
    a rigid foam core extending substantially uniformly across the lateral width of the floor, said core being sandwiched between the upper surface of the subfloor member and the lower surface of the top floor member, said foam core having sufficient strength to transfer a cargo load from the top floor member to the subfloor member without additional support structure interconnecting the top floor member and subfloor member wherein the lower surface of said top floor member is configured to minimize stress in the foam core; and
    wherein the lower surface of said top floor member includes a plurality of downwardly projecting segments, said segments including arcuate lower end portions.

12. A composite floor for an insulated trailer, said floor comprising:
  a unitary subfloor member, said subfloor member having an upper surface and a lower surface;
  a unitary top floor member, said top floor member having an upper surface and a lower surface; and
  a rigid foam core, said core being sandwiched between the upper surface of the subfloor member and the lower surface of the top floor member wherein said lower surface of said top floor member is coated with a water based self-etching primer to prevent corrosion.

13. A composite floor for an insulated trailer, said floor comprising:
  a unitary subfloor member, said subfloor member having an upper surface and a lower surface;
  a unitary top floor member, said top floor member having an upper surface and a lower surface;
  a rigid foam core, said core being sandwiched between the upper surface of the subfloor member and the lower surface of the top floor member, the lower surface of said top floor member being configured to minimize stress in said foam core; and
  wherein the lower surface of said top floor member includes a series of foam contact portions in a first horizontal plane and a series of foam contact portions in a second substantially parallel plane, both said foam contact portions including rounded edges to minimize stress in the foam core.

14. A composite floor for an insulated trailer, said floor comprising:
  a unitary subfloor member, said subfloor member having an upper surface and a lower surface;
  a unitary top floor member, said top floor member having an upper surface and a lower surface;
  a rigid foam core, said core being sandwiched between the upper surface of the subfloor member and the lower surface of the top floor member, the lower surface of said top floor member being configured to minimize stress in said foam core; and
  wherein the lower surface of said top floor member includes a plurality of downwardly projecting segments, said segments including arcuate lower end portions.

15. A composite floor for an insulated trailer, said floor comprising:
  a unitary subfloor member, said subfloor member having an upper surface and a lower surface;
  a unitary top floor member, said top floor member having an upper surface and a lower surface; and
  a rigid foam core, said core being sandwiched between the upper surface of the subfloor member and the lower surface of the top floor member, said composite floor having a front portion and a rear portion, said foam core having a density of more than approximately 6 lb./Cf in the front portion and a density of more than approximately 12 lb./Cf in the rear portion.

16. A monocoque trailer, said trailer comprising:
  a plurality of side wall structures, each of said side wall structures including a top rail and a bottom rail interconnected by a side wall;
  a front and rear end structure and a roof structure; and
  a floor structure, said floor structure including a plurality of cross members connected on opposite ends to said bottom rails for supporting a floor, and a one-piece composite floor received on said crossmembers, said one-piece composite floor including a unitary subfloor member, said subfloor member having an upper surface and a lower surface, a unitary top floor member, said top floor member having an upper surface and a lower surface, and a rigid foam core extending substantially uniformly across the lateral width of the floor, said core being sandwiched between the upper surface of the subfloor member and the lower surface of the top floor member wherein said foam core has sufficient strength to transfer a cargo load and handling device load from the top floor member to the crossmembers without additional support structure interconnecting the top floor member and subfloor member;
  wherein the bottom surface of said top floor member is configured to minimize stress in the foam core; and
  wherein the lower surface of said top floor member includes a series of foam contact portions in a first horizontal plane and a series of foam contact portions in a second substantially parallel plane, both said foam contact portions including rounded edges to minimize stress in the foam core.

17. A monocoque trailer as stated in claim 16, wherein said top floor member is configured without defining any holes therein to prevent fluid from entering the foam core.

18. A monocoque trailer as stated in claim 16, wherein the lower surface of said top floor member is prime coated to prevent corrosion of the top floor member.

19. A monocoque trailer as stated in claim 16, wherein said foam core has a density of approximately six pounds per cubic foot (6 lb./Cf).

20. A monocoque trailer, said trailer comprising:
  a plurality of side wall structures, each of said side wall structures including a top rail and a bottom rail interconnected by a side wall;
  a front and rear end structure and a roof structure; and
  a floor structure, said floor structure including a plurality of cross members connected on opposite ends to said bottom rails for supporting a floor, and a one-piece composite floor received on said crossmembers, said one-piece composite floor including a unitary subfloor member, said subfloor member having an upper surface and a lower surface, a unitary top floor member, said top floor member having an upper surface and a lower surface, and a rigid foam core, said core being sandwiched between the upper surface of the subfloor member and the lower surface of the top floor member wherein said foam core has sufficient strength to transfer a cargo load and handling device load from the top floor member to the crossmembers without additional floor sills being located therebetween,
  wherein said composite floor is maintained in place in said floor structure without mechanical securement to said crossmembers.

21. A monocoque trailer, said trailer comprising:
  a plurality of side wall structures, each of said side wall structures including a top rail and a bottom rail interconnected by a side wall;
  a front and rear end structure and a roof structure; and
  a floor structure, said floor structure including a plurality of cross members connected on opposite ends to said bottom rails for supporting a floor, and a one-piece composite floor received on said crossmembers, said one-piece composite floor including a unitary subfloor member, said subfloor member having an upper surface and a lower surface, a unitary top floor member, said top floor member having an upper surface and a lower surface, and a rigid foam core extending substantially uniformly across the lateral width of the floor, said core being sandwiched between the upper surface of the subfloor member and the lower surface of the top floor member wherein said foam core has sufficient strength to transfer a cargo load and handling device load from the top floor member to the crossmembers without additional support structure interconnecting the top floor member and subfloor member; and wherein said subfloor member is configured without defining any holes therein to prevent fluid from entering the foam core.

22. A monocoque trailer, said trailer comprising:

a plurality of side wall structures, each of said side wall structures including a top rail and a bottom rail interconnected by a side wall;

a front and rear end structure and a roof structure; and a floor structure, said floor structure including a plurality of cross members connected on opposite ends to said bottom rails for supporting a floor, and a one-piece composite floor received on said crossmembers, said one-piece composite floor including a unitary subfloor member, said subfloor member having an upper surface and a lower surface, a unitary top floor member, said top floor member having an upper surface and a lower surface, and a rigid foam core, said core being sandwiched between the upper surface of the subfloor member and the lower surface of the top floor member wherein said foam core has sufficient strength to transfer a cargo load and handling device load from the top floor member to the crossmembers without additional floor sills being located therebetween, wherein said composite floor has a front section configured to be located at the front of the trailer and said composite floor has a rear section configured to be located at the rear of the trailer, the density of the foam core being greater at the rear section than at the front section.

23. A monocoque trailer as stated in claim 22, wherein the density of the foam at the front section is approximately 6 lb./Cf and the density at the rear section is approximately 12 lb./Cf.

24. A monocoque trailer as stated in claim 22, wherein the lower surface of said top floor member includes a series of foam contact portions in a first horizontal plane and a series of foam contact portions in a second substantially parallel plane, both said foam contact portions including rounded edges to minimize stress in the foam core.

* * * * *